Sept. 26, 1961
S. GLOBE
3,002,062
METHOD OF INCREASING SENSITIVITY OF
VIBRATION SENSITIVE ELEMENT
Filed Feb. 7, 1955
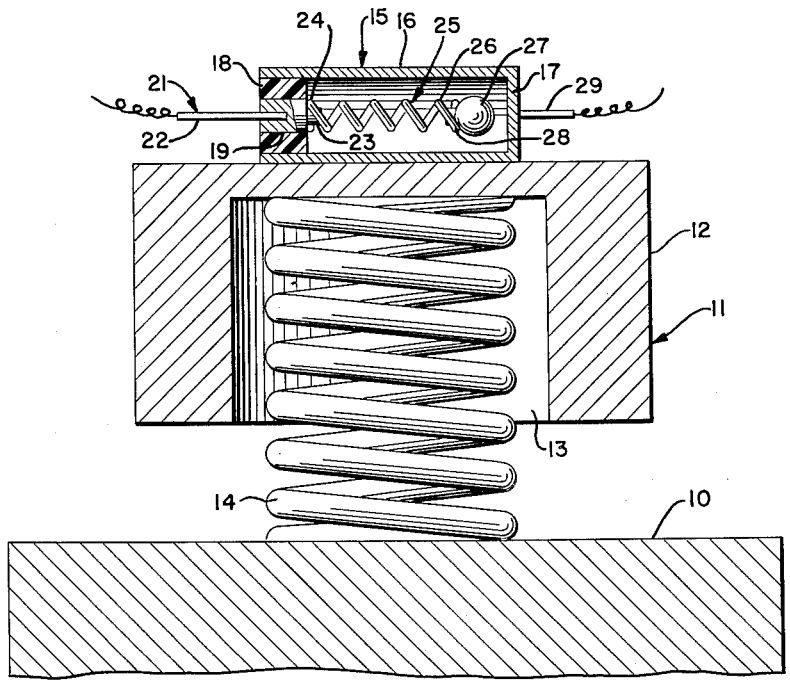
INVENTOR
SAMUEL GLOBE
BY
ATTORNEYS

3,002,062
METHOD OF INCREASING SENSITIVITY OF VIBRATION SENSITIVE ELEMENT
Samuel Globe, Hyattsville, Md., assignor to the United States of America as represented by the Secretary of the Navy
Filed Feb. 7, 1955, Ser. No. 486,740
8 Claims. (Cl. 200—61.01)
(Granted under Title 35, U.S. Code (1952), sec. 266)

The invention described herein may be manufactured and used by or for the Government of the United States of America for governmental purposes without the payment of any royalties thereon or therefor.

The present invention relates to a vibratory device and more particularly to a new and improved vibrational amplifying system adapted to respond to minute vibrations received thereby through a surrounding medium such, for example, as ground or water by way of a casing to which the system is attached.

Moreover, the invention relates to a highly sensitive mechanical amplifying system suitable for use in an ordnance missile such, for example, as acoustic marine mines, aerial launched delay bombs, land mines and the like and adapted to operate certain control circuits as the system is actuated by a shock or wave of relatively weak strength received thereby. The system comprises a pendulous structure secured to and enclosed within an ordnance missile and having a switch secured thereto including a second pendulous structure. The vibrations received through the casing are amplified by the first pendulous structure whereupon the second pendulous structure is actuated to close the switch in response to minute sound signals received through the supporting structure of the device. Furthermore, the aforesaid amplifying pendulous structure may be advantageously used for increasing the sensitivity of vibrating reed type switches, piezoelectric crystals and magnetic pick-up devices.

An object of the present invention is to provide a new and improved vibrational system including a switch rendered effective to close an electrical circuit in response to a relatively weak signal received by the system.

Another object of the invention is the provision of a new and improved two mass vibrating device wherein the range of frequency response of the vibratory switch secured to one of the masses is broadened and the sensitivity thereof increased.

Still another object of the invention is the provision of a new and improved acoustically controlled device wherein means responsive to sound signal increase the sensitivity of sensiitve switches or vibrating elements without changing the inherent sensitivity of such switches or elements.

Other objects and many of the attendant advantages of this invention will be readily appreciated as the same becomes better understood by reference to the following detailed description when considered in connection with the accompanying drawing illustrating a single figure of the device constructed in accordance with the present invention.

Referring now to the single figure of the drawing, for a more complete understanding of the invention, the numeral 10 indicates a movable support or table upon which is yieldably mounted the vibratory system constructed in accordance with the present invention and generally designated by the reference 11. The system comprises a mass 12 having a centrally disposed well 13 formed therein, the mass being yieldably supported in spaced relation with respect to the table 10 by a helical spring 14. The spring 14 is disposed within the well 13 having one end secured to the mass 12, the other end thereof being secured to the table 10, the spring may be secured to the mass and table in any conventional manner such, for example, as by welding or bolting the parts together. By the aforesaid mass and spring arrangement a sensitive pendulous amplifying structure is provided and thus when the table 10 is subjected to shocks or waves the shocks or waves are amplified by the pendulous structure. Moreover, the size of the mass 12 and the stiffness of the spring 14 of the pendulous structure are such that their resonant frequency is equal to the frequency of the vibration at which the structure is desired to function.

A vibrational sensitive switch generally indicated by the reference character 15 is secured to the mass 12 in any suitable manner and comprises a casing 16 composed of suitable electrical conducting material and provided an annular cup-shaped contact for the switch. One end of the casing 16 is sealed by a wall 17, the other end thereof being sealed by a plug 18 composed of suitable insulating material and having a centrally disposed bore 19 formed therein and extending therethrough. A conductor 21 is disposed within the bore 19 having a terminal 22 arranged externally of the casing 16 thereby to provide an external electrical connection thereto, the other end 23 thereof being disposed within the casing. Secured to the end 23 of the conductor 21 as at 24 is a pendulous element 25, the element comprising a helical spring 26 extending substantially the full length of the casing 16 and having a mass or contact element 27 secured to the free end thereof as at 28. The casing 16 has formed thereon a terminal 29 thereby to provide an external electrical connection thereto. The terminals 22 and 29 of the switch may be connected to an electrical control circuit, the circuit being completed by the switch as the helical spring 26 is subjected to vibrations by reason of the aforesaid amplifying structure whereupon the contact is moved into engagement with the annular contact of the switch.

By the aforesaid arrangement it will be understood that by reason of the pendulous structure the sensitivity of the vibrating element of the switch is increased over and above the inherent sensitivity thereof when the switch is mounted on a rigid support. Moreover, the aforesaid structure provides two vibratory systems, one of which comprises a spring and mass secured to a support and actuated by a predetermined frequency. The other vibratory system comprises a conductive casing secured to the mass and having a reed or helical spring carrying a second mass. By the aforesaid arrangement the range of frequency of the vibratory system of the switch is broadened and the sensitivity thereof increased such that the vibrational element of the switch is adapted to be actuated to close the switch in response to minute sound signals received by the first vibratory system through the supporting structure. Furthermore, when sound signals having a frequency content resident within the frequency response range of the mass 12 and spring 14, comprising the first vibrating system the mass and spring are set in vibration. When this occurs, the vibrating spring 26 and the mass 28 carried thereby, comprising the second vibrating system are set in vibration, whereupon the mass 28 is moved into engagement with the conductive casing 16 closing the switch.

From the foregoing, it will be apparent that a new and improved mechanical amplifying system has been devised having means whereby the range of frequency response of a sensitive switch element is broadened and the sensitivity thereof increased. In the aforesaid arrangement the size of the mass and the stiffness of the spring is such that the resonant frequency thereof is equal to the vibrations it is desired to sense. It will be understood, however, that if desired the resonant frequency of the mass and spring may equal the resonant frequency of the switch.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a sound responsive device, a first pendulous vibratory system freely vibratable in any direction for amplifying sound signals received thereby and having a resonant frequency equal to the frequency at which the system is adapted to vibrate, a second pendulous vibratory system freely vibratable in any direction with respect to said first system and fixedly secured to said first system with the axis thereof at a right angle with respect to the axis of said first system and responsive to the vibration of said first system, and circuit control means carried by said second system and operated in response to said vibrations.

2. In a mechanical amplifying device, a first pendulous vibratory system freely vibratable in any direction for amplifying sound signal of a predetermined value received thereby, a second pendulous vibratory system freely vibratable in any direction with respect to said first system and fixedly secured to said first system with the axis thereof at a right angle with respect to the axis of said first system and adapted to amplify said amplified signals received thereby through said first system whereby said second system is vibrated in response to minute sound signals received by said first system, and contact means carried by said second pendulous system and actuated in response to said vibrations.

3. A sound responsive device comprising a support responsive to sound signals of a predetermined value, a first vibratory element secured to said support, a first mass secured to said element and vibratable in any direction with respect to said support, said mass and vibratory element being adapted to amplify said sound signals, a cup-shaped contact secured to said mass, a second vibratory element disposed within and having one end thereof secured to and insulated from said contact, a second mass secured to the free end of said second element and having a weight less than the weight of said first mass, said second mass and second vibratory element being adapted to vibrate in any direction relative to said first vibration element and amplify said amplified signals received thereby through said first mass and first element, said second mass being composed of electrical conducting material and movable into engagement with said contact when said first element and mass is actuated in response to said sound signals.

4. In a mechanical amplifying vibratory device, a pair of pendulous vibratory systems, one of said systems being fixedly secured to the other system in such a manner as to be freely vibratable in any direction and vibrated by minute amounts of acoustic energy received by the other system, said other system being freely vibratable in any direction with respect to said one system and having a resonant frequency equal to the frequency at which the system is adapted to be vibrated, the axes of said systems being mutually perpendicular, and circuit control means on said one system and operable in response to said vibration received thereby.

5. A mechanical amplifying vibratory device comprising a support responsive to sound signals, a first vibratory helical spring having one end thereof secured to said support and vibrated by sound signals received through said support, a first mass secured to the free end of said helical spring and vibratable in any direction therewith, a cup-shaped contact secured to said first mass, a second vibratory helical spring disposed within and having one end thereof secured to and insulated from said contact, a second mass of less weight than said first mass and composed of electrical conducting material secured to the free end of said second helical spring and vibratable in any direction with respect to said first mass for engagement with said contact as said device is vibrated in response to minute sound signals received through said support.

6. A mechanical amplifying vibratory device of the character disclosed comprising a helical spring having a first mass secured to the free end thereof and adapted to be set in vibration as sound signals are received thereby, said spring and mass comprising a first pendulous vibratory system vibratable in any direction and having a vibrational frequency of predetermined value, a second pendulous vibratory system secured to said first mass with the axis thereof at a right angle with respect to the axis of said first system and comprising a second helical spring having a second mass composed of electrical conducting material secured to the free end thereof and vibratable in any direction with respect to said first system, said spring and mass of the second vibratory system being tuned to the same vibrational frequency, and a cup-shaped contact secured to the mass of said first vibratory system and engaged by said conductive mass as said second system is vibrated by said first system.

7. In a mechanical amplifier, a first pendulous vibratory system freely vibratable in any direction for amplifying sound signals received thereby and having a resonant frequency equal to the frequency at which said system is adapted to be vibrated, a second pendulous vibratory system fixedly secured at a right angle to said first system and tuned to the same frequency as said first system and vibrated thereby freely in any direction with respect to the first system, and circuit control means secured to said second system and operated as said system is vibrated.

8. In a vibratory system, in combination, a source of vibrations, a first vibratory element coupled to said source and vibratable in any direction, a second vibratory element fixedly coupled at a right angle to said first vibratory element, said second element being vibratable in any direction with respect to said first element and having less inertia than said first vibratory element, whereby the vibration of the first vibratory element is amplified by said second element.

References Cited in the file of this patent

UNITED STATES PATENTS

| | | |
|---|---|---|
| 1,078,410 | Bock | Nov. 11, 1913 |
| 1,837,140 | Thew | Dec. 15, 1931 |